(12) United States Patent
Tsurumi (10) Patent No.: US 7,061,713 B2
(45) Date of Patent: Jun. 13, 2006

(54) DISK STORAGE

(75) Inventor: Hiroshi Tsurumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 48 days.

(21) Appl. No.: 10/351,085

(22) Filed: Jan. 24, 2003

(65) Prior Publication Data

US 2004/0032688 A1 Feb. 19, 2004

(30) Foreign Application Priority Data

Aug. 16, 2002 (JP) ............................. 2002-237620

(51) Int. Cl.
*G11B 5/596* (2006.01)

(52) U.S. Cl. .................................................. 360/78.04

(58) Field of Classification Search ............. 360/78.04, 360/78.07, 78.09, 75, 46; 711/112, 113, 711/111, 4, 202; 714/54; 703/25
See application file for complete search history.

(56) References Cited

U.S. PATENT DOCUMENTS

| 5,444,583 | A | * | 8/1995 | Ehrlich et al. ............ 360/78.09 |
| 5,606,468 | A | * | 2/1997 | Kodama ........................ 360/75 |
| 5,664,143 | A | * | 9/1997 | Olbrich ....................... 711/112 |
| 5,862,363 | A | * | 1/1999 | Taroda et al. ................. 703/25 |
| 5,873,125 | A | * | 2/1999 | Kawamoto ................... 711/202 |
| 6,195,222 | B1 | * | 2/2001 | Heminger et al. ........ 360/78.07 |
| 6,389,508 | B1 | * | 5/2002 | Tamura ....................... 711/112 |
| 6,484,229 | B1 | * | 11/2002 | Ichikawa et al. .............. 711/4 |
| 6,523,086 | B1 | * | 2/2003 | Lee ............................. 711/113 |
| 6,532,122 | B1 | * | 3/2003 | Sugawara et al. ............. 360/46 |
| 6,578,107 | B1 | * | 6/2003 | Anderson et al. ........... 711/113 |
| 6,654,195 | B1 | * | 11/2003 | Frank et al. ................... 360/75 |
| 6,654,850 | B1 | * | 11/2003 | Fox et al. .................... 711/111 |
| 6,697,913 | B1 | * | 2/2004 | Hansen et al. .............. 711/112 |
| 6,721,906 | B1 | * | 4/2004 | Hirashita et al. ............. 714/54 |
| 6,731,453 | B1 | * | 5/2004 | Korbel et al. ............ 360/78.04 |
| 6,772,283 | B1 | * | 8/2004 | Taroda et al. ............... 711/112 |

FOREIGN PATENT DOCUMENTS

JP 2-156472 6/1990

* cited by examiner

*Primary Examiner*—David Hudspeth
*Assistant Examiner*—Fred F. Tzeng
(74) *Attorney, Agent, or Firm*—Greer, Burns & Crain, Ltd.

(57) ABSTRACT

In a disk storage a command controller issues a seek command and transmits it to a seek command manager. A head position controller performs a seek operation. If the head position controller is not busy with the seek operation, the seek command manager transmits the seek command to the head position controller. If the head position controller is busy with the seek operation, the seek command manager queues the seek command in a memory and transmits the seek command to the head position controller after the head position controller has finished the seek operation.

5 Claims, 10 Drawing Sheets

| ACTION | CMD reg | Command Int | Queue Sts | Drive Sts | Drive Int | Command Exec | DSP Busy | Waypoint Latch |
|---|---|---|---|---|---|---|---|---|
| 0.INITIAL STATUS | xx | 0 | 0 | xx | 0 | 0 | 0 | 0 |
| 1.ISSUE OF COMMAND A | A | 1 | 1 | xx | 0 | 0 | 0 | 0 |
| 2.INTERRUPT REQUEST TO HEAD POSITION CONTROLLER | A | 1 | 1 | xx | 0 | 0 | 0 | 0 |
| 3.TRANSMISSION OF COMMAND A | A | 0 | 1 | xx | 0 | 0 | 1 | 0 |
| 4.OBTAINING OF PARAMETERS BY HEAD POSITION CONTROLLER | A | 0 | 0 | xx | 0 | 0 | 1 | 0 |
| 5.EXECUTION OF COMMAND A | A | 0 | 0 | xx | 0 | 1 | 1 | 0 |
| 6.CONFIRMATION OF COMMAND EXECUTABILITY OF NEXT COMMAND | A | 0 | 0 | xx | 0 | 1 | 1 | 0 |
| 7.ISSUE OF COMMAND B | B | 1 | 1 | xx | 0 | 1 | 1 | 0 |
| 8.INTERRUPT REQUEST TO HEAD POSITION CONTROLLER | B | 1 | 1 | xx | 0 | 1 | 1 | 0 |
| 9.END OF COMMAND A | B | 1 | 1 | Good | 0 | 0 | 1 | 0 |
| 10.PROCESS OF END OF COMMAND A | B | 1 | 1 | Good | 1 | 0 | 0 | 0 |
| 11.REPORT END OF COMMAND A | B | 1 | 1 | Good | 1 | 0 | 0 | 0 |
| 12.CONFIRMATION OF END OF COMMAND A | B | 1 | 1 | Good | 0 | 0 | 0 | 0 |
| 13.TRANSMISSION OF COMMAND B | B | 0 | 1 | Good | 0 | 0 | 0 | 0 |
| 14.OBTAINING OF PARAMETERS BY THE HEAD POSITION CONTROLLER | B | 0 | 0 | Good | 0 | 0 | 1 | 0 |
| 15.CONFIRMATION OF COMMAND EXECUTABILITY | B | 0 | 0 | Good | 0 | 0 | 1 | 0 |
| 16.EXECUTION OF COMMAND B | B | 0 | 0 | Good | 0 | 1 | 1 | 0 |

| ACTION | CMD reg | Command Int | Queue Sts | Drive Sts | Drive Int | Command Exec | DSP Busy | Waypoint Latch |
|---|---|---|---|---|---|---|---|---|
| 0. INITIAL STATUS | xx | 0 | 0 | xx | 0 | 0 | 0 | 0 |
| 1. ISSUE OF COMMAND A | A | 1 | 1 | xx | 0 | 0 | 0 | 0 |
| 2. INTERRUPT REQUEST TO HEAD POSITION CONTROLLER | A | 1 | 1 | xx | 0 | 0 | 0 | 0 |
| 3. TRANSMISSION OF COMMAND A | A | 0 | 1 | xx | 0 | 0 | 1 | 0 |
| 4. OBTAINING OF PARAMETERS BY HEAD POSITION CONTROLLER | A | 0 | 0 | xx | 0 | 0 | 1 | 0 |
| 5. WITHHOLDING OF COMMAND A EXECUTION | A | 0 | 0 | xx | 0 | 0 | 1 | 0 |
| 6. CONFIRMATION OF COMMAND EXECUTABILITY OF NEXT COMMAND | A | 0 | 0 | xx | 0 | 0 | 1 | 0 |
| 7. ISSUE OF COMMAND B | B | 1 | 1 | xx | 0 | 0 | 1 | 0 |
| 8. INTERRUPT REQUEST TO HEAD POSITION CONTROLLER | B | 1 | 1 | xx | 0 | 0 | 1 | 0 |
| 9. END OF HEAD OPERATION | B | 1 | 1 | xx | 0 | 0 | 1 | 1 |
| 10. EXECUTION OF COMMAND A | B | 1 | 1 | xx | 0 | 1 | 1 | 0 |
| 11. END OF COMMAND A | B | 1 | 1 | Good | 1 | 0 | 1 | 0 |
| 12. PROCESS OF END OF COMMAND A | B | 1 | 1 | Good | 1 | 0 | 0 | 0 |
| 13. REPORT END OF COMMAND A | B | 1 | 1 | Good | 0 | 0 | 0 | 0 |
| 14. CONFIRMATION OF END OF COMMAND A | B | 1 | 1 | Good | 0 | 0 | 0 | 0 |
| 15. TRANSMISSION OF COMMAND B | B | 0 | 1 | Good | 0 | 0 | 1 | 0 |
| 16. OBTAINING OF PARAMETERS BY THE HEAD POSITION CONTROLLER | B | 0 | 0 | Good | 0 | 0 | 1 | 0 |
| 17. WITHHOLDING OF COMMAND B EXECUTION | B | 0 | 0 | Good | 0 | 0 | 1 | 0 |
| 18. END OF HEAD OPERATION | B | 0 | 0 | Good | 0 | 0 | 1 | 1 |
| 19. EXECUTION OF COMMAND B | B | 0 | 0 | Good | 0 | 1 | 1 | 0 |
| 20. ISSUE OF COMMAND C | C | 1 | 1 | Good | 0 | 1 | 1 | 0 |

| ACTION | CMD reg | Command Int | Queue Sts | Drive Sts | Drive Int | Command Exec | DSP Busy | Waypoint Latch | Seek Abort |
|---|---|---|---|---|---|---|---|---|---|
| 0.INITIAL STATUS (EXECUTING COMMAND A) | A | 0 | 0 | xx | 0 | 1 | 1 | | 0 |
| 1.ISSUE OF CANCEL COMMAND | A | ⊚ | 0 | xx | 0 | 1 | 1 | 0 | 1 |
| 2.CONFIRMATION OF CANCEL COMMAND BY HEAD POSITION CONTROLLER | A | ⊚ | 0 | xx | 0 | 1 | 1 | 0 | 1 |
| 3.CANCEL OPERATION | A | 0 | 0 | xx | 0 | 0 | 0 | 0 | 0 |

| ACTION | CMD reg | Command Int | Queue Sts | Drive Sts | Drive Int | Command Exec | DSP Busy | Waypoint Latch | Seek Abort |
|---|---|---|---|---|---|---|---|---|---|
| 0.INITIAL STATUS (SUPPRESSED COMMAND A) | A | 0 | 0 | xx | 0 | 1 | 1 | | 0 |
| 1.ISSUE OF CANCEL COMMAND | A | ⊚ | 0 | xx | 0 | 1 | 1 | 0 | 1 |
| 2.CONFIRMATION OF CANCEL COMMAND BY HEAD POSITION CONTROLLER | A | ⊚ | 0 | xx | 0 | 1 | 1 | 0 | 1 |
| 3.CANCEL OPERATION | A | 0 | 0 | xx | 0 | 0 | 0 | 0 | 0 |

| ACTION | CMD reg | Command Int | Queue Sts | Drive Sts | Drive Int | Command Exec | DSP Busy | Waypoint Latch | Seek Abort |
|---|---|---|---|---|---|---|---|---|---|
| 0.INITIAL STATUS (COMMAND A EXECUTING AND COMMAND B QUEUED) | B | 1 | 1 | xx | 0 | 1 | 1 | | 0 |
| 1.ISSUE OF CANCEL COMMAND | B | ⊚ | 0 | xx | 0 | 1 | 1 | 0 | 1 |
| 2.CONFIRMATION OF CANCEL COMMAND BY HEAD POSITION CONTROLLER | B | ⊚ | 0 | xx | 0 | 1 | 1 | 0 | 1 |
| 3.CANCEL OPERATION | B | 0 | 0 | xx | 0 | 0 | 0 | 0 | 0 |

| ACTION | CMD reg | Command Int | Queue Sts | Drive Sts | Drive Int | Command Exec | DSP Busy | Waypoint Latch | Seek Abort |
|---|---|---|---|---|---|---|---|---|---|
| 0.INITIAL STATUS (COMMAND B QUEUED, AND COMMAND A SUPPRESSED) | B | 0 | 1 | xx | 0 | 1 | 1 | | 0 |
| 1.ISSUE OF CANCEL COMMAND | B | ⊚ | 0 | xx | 0 | 1 | 1 | 0 | 1 |
| 2.CONFIRMATION OF CANCEL COMMAND BY HEAD POSITION CONTROLLER | B | ⊚ | 0 | xx | 0 | 1 | 1 | 0 | 1 |
| 3.CANCEL OPERATION | B | 0 | 0 | xx | 0 | 0 | 0 | 0 | 0 |

| ACTION | CMD reg | Command Int | Queue Sts | Drive Sts | Drive Int | Command Exec | DSP Busy | Waypoint Latch | Seek Abort |
|---|---|---|---|---|---|---|---|---|---|
| 0.INITIAL STATUS (TRANSMISSION OF CANCEL COMMAND) | x | ⊗ | x | xx | 0 | 1 | 1 | 0 | 1 |
| 1.ISSUE OF COMMAND C | C | ① | 1 | xx | 0 | 1 | 1 | 0 | 1 |
| 2.END OF CANCEL OPERATION | C | 1 | 1 | xx | 0 | 0 | 0 | 0 | 0 |
| 3.TRANSMISSION OF COMMAND C | C | 0 | 1 | xx | 0 | 0 | 0 | 1 | 0 |
| 4.OBTAINING OF PARAMETERS BY THE HEAD POSITION CONTROLLER | C | 0 | 0 | xx | 0 | 0 | 0 | 1 | 0 |

| ACTION | CMD reg | Command Int | Queue Sts | Drive Sts | Drive Int | Command Exec | DSP Busy | Waypoint Latch | Seek Abort |
|---|---|---|---|---|---|---|---|---|---|
| 0. INITIAL STATUS (COMMAND B QUEUED) | B | 1 | 1 | xx | 0 | 1 | 1 | 0 | 0 |
| 1. ABEND OF HEAD POSITION CONTROLLER | B | 1 | 1 | Error | 0 | 0 | 1 | 0 | 0 |
| 2. ERROR PROCESS | B | 0 | 0 | Error | 1 | 0 | 0 | 0 | 0 |
| 3. ERROR REPORT | B | 0 | 0 | Error | 1 | 0 | 0 | 0 | 0 |
| 4. OBTAINING OF PARAMETERS BY THE COMMAND CONTROLLER | B | 0 | 0 | Error | 0 | 0 | 0 | 0 | 0 |
| 5. ISSUE OF COMMAND C | C | 1 | 1 | xx | 0 | 0 | 0 | 0 | 0 |
| 6. INTERRUPT REQUEST TO HEAD POSITION CONTROLLER | C | 1 | 1 | xx | 0 | 0 | 0 | 0 | 0 |

FIG. 8B 59

| ACTION | CMD reg | Command Int | Queue Sts | Drive Sts | Drive Int | Command Exec | DSP Busy | Waypoint Latch | Seek Abort |
|---|---|---|---|---|---|---|---|---|---|
| 0. INITIAL STATUS (COMMAND B QUEUED) | B | 1 | 1 | xx | 0 | 1 | 1 | 0 | 0 |
| 1. PREPARATION FOR REPLACEMENT | B | ① | 1 | xx | 0 | 1 | 1 | 0 | 0 |
| 2. ISSUE OF COMMAND C | C | ① | 1 | xx | 0 | 1 | 1 | 0 | 0 |
| 3. END OF REPLACEMENT | C | 1 | 1 | xx | 0 | 1 | 1 | 0 | 0 |

DISK STORAGE

BACKGROUND OF THE INVENTION

1) Field of the Invention

The present invention relates to a disk storage that can perform an efficient seek operation.

2) Description of the Related Art

Disk storage is commonly used as a storage medium. In this disk storage, a disk is allocated with areas for data storage and, when reading the data, the disk is rotated and a reading head is made to access a specific area of the rotating disk.

Figure 9:
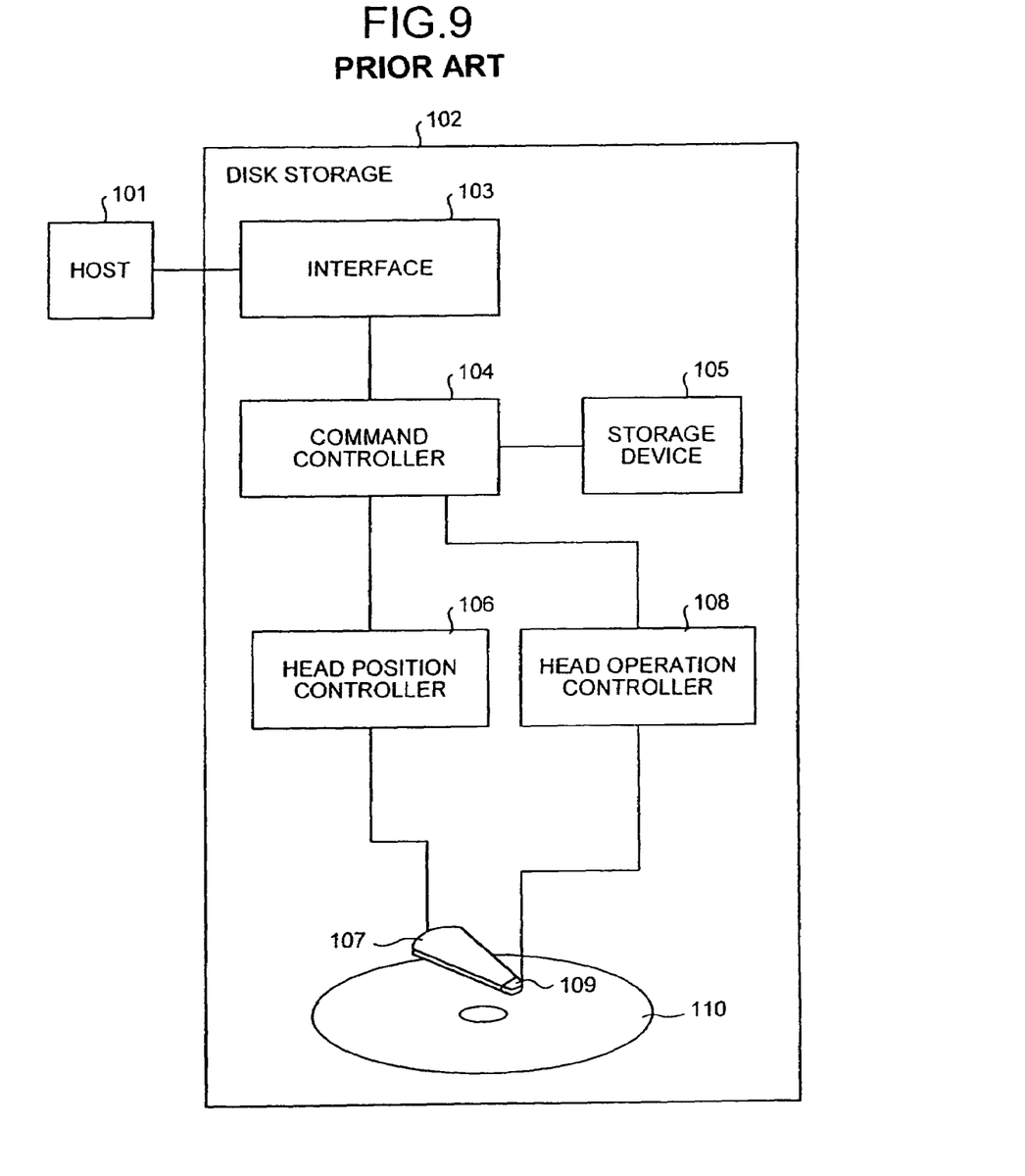
FIG. 9 is a schematic representation of a conventional disk storage.

FIG. 9 shows a schematic diagram of conventional disk storage 102. The disk storage 102 comprises an interface 103, a command controller 104, a storage section 105, a head position controller 106, a head operation controller 108, an actuator 107, and a head 109. The reference numeral 110 indicates the disk.

The interface 103 is connected to a host 101, which is an external device. The interface 103 transmits to the command controller 104 a request received from the host 101. The command controller transmits, based on the request received via the interface 103, a command to the head position controller 106 and the head operation controller 108. The head position controller 106 and the head operation controller 108 carry out the reading or writing of data from or to the disk 110. For instance, when the command controller 104 receives a read request from the host 101, it issues, based on the received read request, a seek command that specifies the position, from where the data is to be read, on the disk and a read command that specifies the reading. When the command controller 104 receives a write request from the host 101, it issues, based on the received write request, a seek command that specifies the position, where the data is to be written, on the disk and a write command that specifies the writing.

The command controller 104 transmits the seek command to the head position controller 106. The read command and the write command issued by the command controller 104 are transmitted to the head operation controller 108. The head position controller 106 controls the actuator 107 according to the received seek command, and determines the positions of the disk 110 and the head 109. A seek operation is the moving of the head 109 to a specific area on the disk 110 by controlling the actuator 107. The head operation controller 108, based on the received read command and write command, carries out reading from and writing to the disk 110.

Figure 10:
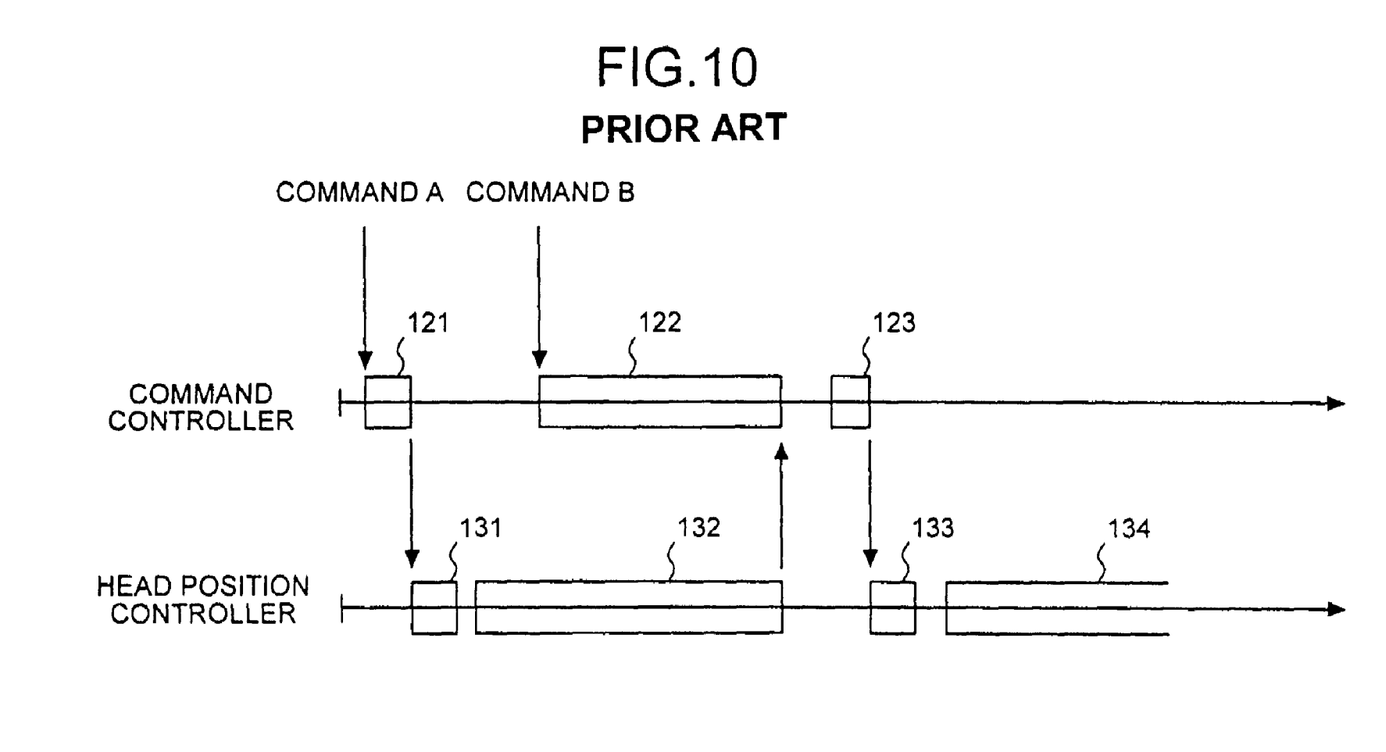
FIG. 10 is a schematic drawing explaining the seek operation in the conventional disk storage.

The seek operation of the disk storage 102 is described with reference to FIG. 10. The command controller 104 issues a seek command A based on the request received from the host 101. The command controller 104 then transmits the issued seek command A to the head position controller 106 (operation 121).

The head position controller 106 receives the seek command from the command controller 104 (operation 131) and executes the seek operation (operation 132) by activating the actuator 107 based on the seek command A.

In case the seek command A issued by the command controller 104 is to be abandoned and a different location is to be sought instead, the command controller 104 cannot issue another seek command to the head position controller 106 since the head position controller 106 is already busy executing the seek command A. Consequently, the command controller 104 stands by (operation 122) till the head position controller 106 has finished the seek operation. Once the information that the seek operation has ended is received from the head position controller 106, the command controller 104 issues a seek command B and transmits it to the head position controller 106 (operation 123). After the head position controller 106 receives the seek command B (operation 133), it activates the actuator 107 and executes the seek operation (operation 134).

Thus, in the conventional disk storage 102, the reading from and writing to the disk are carried out when the head 109 accesses the required location of the disk 110 in the seek operation.

However, in the conventional disk storage, when the head position controller 106 is carrying out a seek operation, the next seek command from the command controller 104 cannot be executed until the first seek operation ends. Since the command controller 104 performs many other tasks such as, communication with the host 101, cache control, execution of read command, write command, and others, the operating speed of the storage disk is considerably slowed by having to stand by for the seek operation.

There has been an increasing demand for high-capacity, high-speed disk storage in recent years. Hence, efficient seek command processing has become a crucial factor for meeting the demand. The conventional disk storage thus fails in this respect.

SUMMARY OF THE INVENTION

It is an object of this invention to provide a high-speed disk storage.

The disk storage according to one aspect of the present invention has a command controller that issues, based on a read request and a write request, a seek command that specifies a position of a head on a disk, a write command that specifies writing of data on the disk, and a read command that specifies reading of data from the disk; a head position controller that carries out a seek operation according to the seek command; a head operation controller that controls the head or the disk and carries out the reading of the data from the disk and the writing of the data on the disk according to the read command and the write command; a seek monitoring section that determines whether or not the head position controller is in the process of the seek operation; and a command queuing section that, based on the determination by the seek monitoring section, queues the seek command that is issued by the command controller when the head position controller is in the process of the seek operation, and transmits the seek command to the head position controller after the head position controller has finished the seek operation.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 7 is a set of tables that show the status parameters of the seek command manager during canceling of a queued command.

DETAILED DESCRIPTIONS

Exemplary embodiment(s) of a disk storage according to the present invention is explained next with reference to the accompanying drawings.

Figure 1:
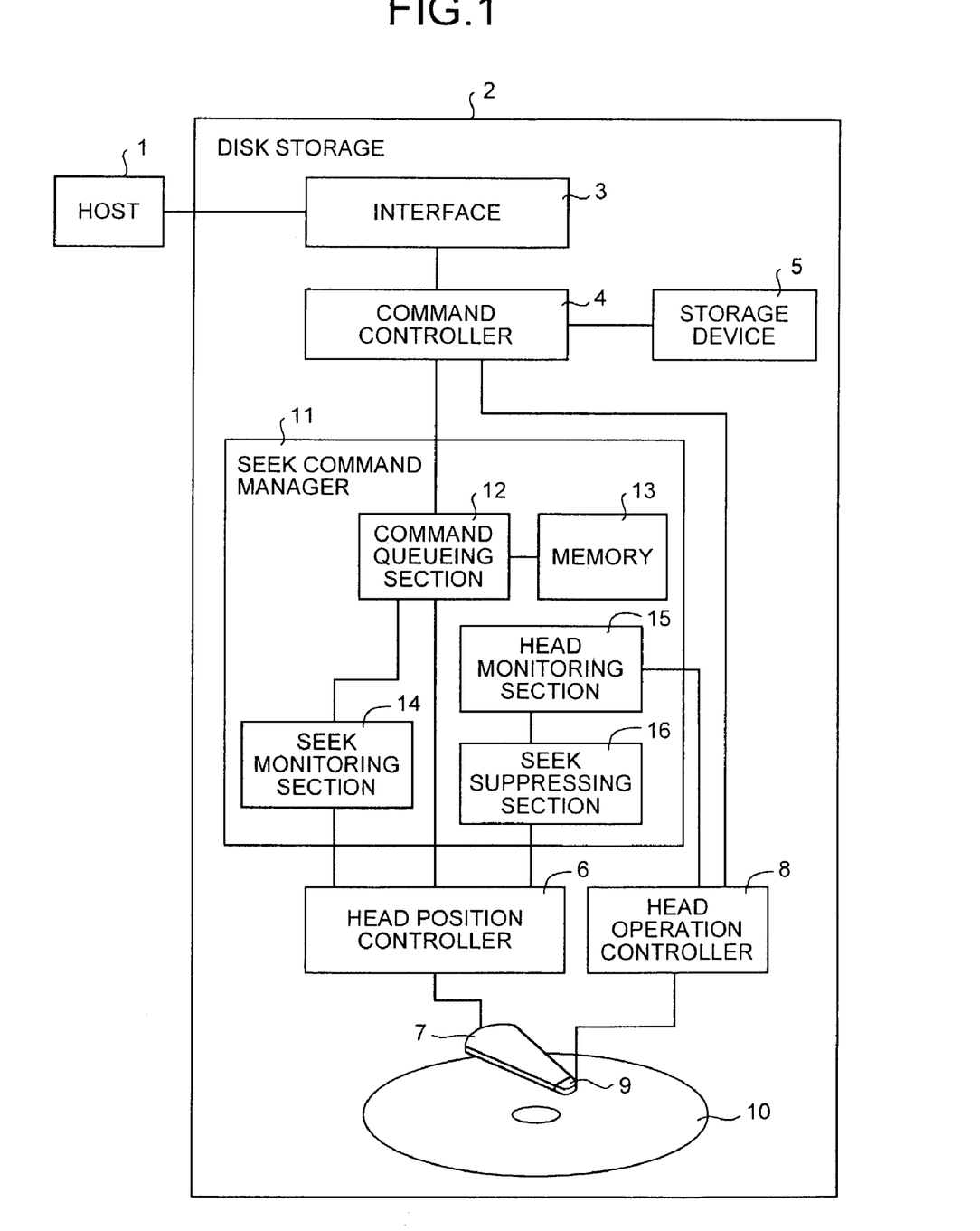
FIG. 1 is a schematic representation of a disk storage according to the present invention.

FIG. 1 shows a schematic diagram of a disk storage 2 according to an exemplary embodiment of the present invention. The disk storage 2 includes an interface 3, a command controller 4, a storage section 5, a seek command manager 11, a head position controller 6, and a head operation controller 8.

The interface 3 is connected to a host 1, which is an external device. The interface 3 transmits to the command controller 4 a request received from the host 1. The command controller transmits, based on the request received via the interface 3, a command to the head position controller 6 and the head operation controller 8. The head position controller 6 and the head operation controller 8 carry out the reading or writing of data from or to the disk 10. For instance, when the command controller 4 receives a read request from the host 1, it issues, based on the received read request, a seek command that specifies the position, from where the data is to be read, on the disk and a read command that specifies the reading. When the command controller 4 receives a write request from the host 1, it issues, based on the received write request, a seek command that specifies the position, where the data is to be written, on the disk and a write command that specifies writing.

The read command and the write command issued by the command controller 4 are transmitted to the head operation controller 8. The head operation controller 8, based on the received read command and write command, carries out reading from and writing to the disk 10.

The command controller 4 transmits the seek command to the seek command manager 11. The seek command manager 11 transmits the received seek command to the head position controller 6 and makes the head position controller 6 control the actuator 7. The head position controller 6 controls the actuator 7 according to the received seek command, thereby determining the positions of the disk 10 and the head 9. The moving of the head 9 to a specific area on the disk 10 by controlling the actuator will be referred to as a seek operation.

When the head position controller 6 is busy with the seek operation, the head position controller 6 holds the next seek command issued by the command controller 4 until the current seek operation ends and then transmits the next seek command to the head position controller 6. The seek command manager 11 will be explained in greater detail here. The seek command manager 11 includes a command queu-ing section 12, a memory 13, a seek monitoring section 14, a head monitoring section 15, and a seek suppressing section 16.

The seek monitoring section 14 monitors the seek operation of the head position controller 6. The command queuing section 12 receives the seek command from the command controller 4 and, based on the result of monitoring by seek monitoring section 14, determines whether to transmit or queue the seek command. If the head position controller 6 is not performing the seek operation, the command queuing section 12 transmits the received seek command to the head position controller 6. If the head position controller 6 is busy with the seek operation, the command queuing section 12 queues the seek command in the memory 13. When the seek monitoring section 14 detects that the seek operation has ended, the command queuing section 12 retrieves the seek command stored in the memory 13 and transmits the seek command to the head position controller 6.

The head monitoring section 15 monitors the reading and writing operations performed by the head operation controller 8. The seek suppressing section 16 suppresses, based on the result of monitoring by the head monitoring section 15, the seek operation of the head position controller 6 when the head operation controller 6 is executing reading or writing.

Figure 2:
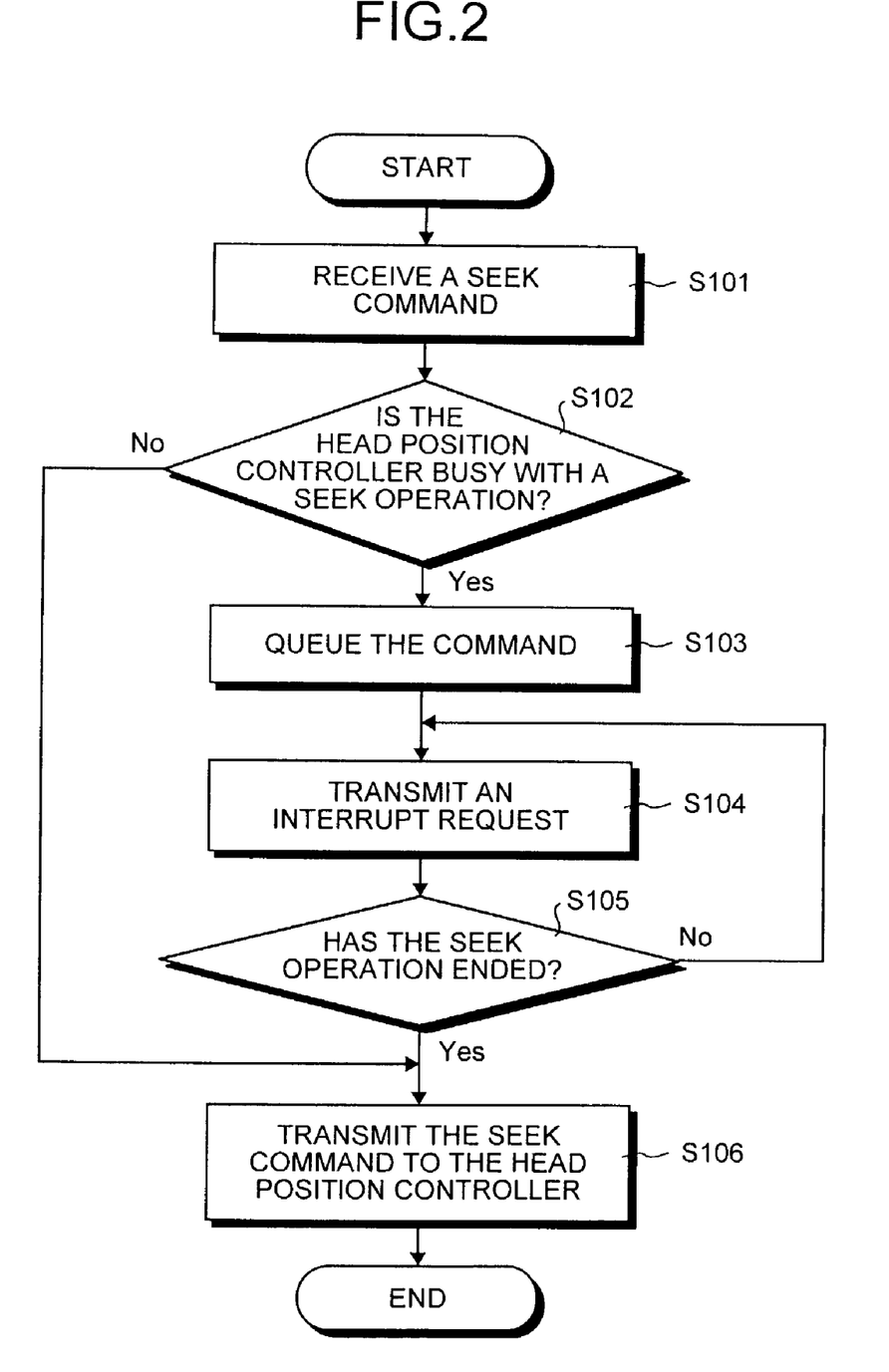
FIG. 2 is a flow chart that explains the steps of action of a seek command manager shown in FIG. 1.

FIG. 2 is a flow chart that explains the sequence of operations performed by the seek command manager 11. First, the command queuing section 12 receives the seek command (step S101). Next, the seek monitoring section 14 determines whether or not the head position controller 6 is busy with the seek operation (step S102).

If the head position controller 6 is busy with the seek operation ('Yes' in step S102), the command queuing section 12 queues the received seek command in the memory 13 (step S103). The seek monitoring section 14 transmits an interrupt request to the head position controller 6 (step S104), and determines whether or not the seek operation has ended (step S105). If the seek operation of the head position controller 6 has not ended ('No' in step S105), the seek monitoring section 14 transmits an interrupt request once again to the head position controller 6 (step S104).

If the head position controller 6 is not busy with the seek operation ('No' in step S102) or if the seek operation of the head position controller 6 has ended ('Yes' in step S105), the command queuing section 12 transmits the seek command to the head position controller 6 (step S106) and the process ends here.

Figure 3:
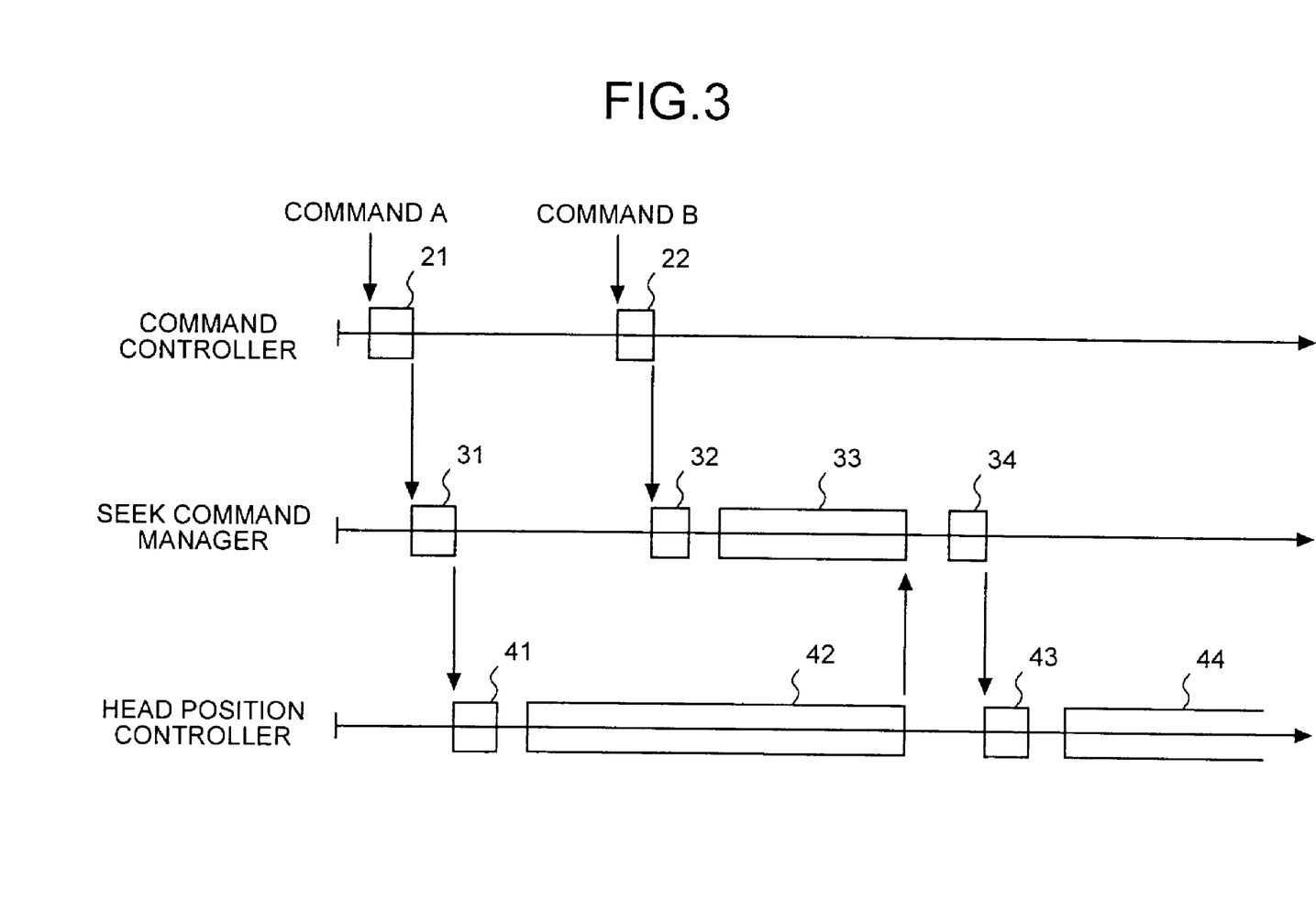
FIG. 3 is a schematic drawing that explains a seek operation of a disk storage.

The seek operation of a disk storage will be explained with reference to FIG. 3. The command controller 4 issues the seek command A based on the request received from the host 1. The command controller 4 then transmits the received seek command A to the seek command manager 11 (operation 21).

The seek command manager 11 receives the seek command A from the command controller 4, and transmits the seek command A to the head position controller 6 (operation 31). The head position controller 6 receives the seek command A from the seek command manager 11 (operation 41), activates the actuator 7 based on the seek command A, and carries out the seek operation (operation 42).

When the command controller 4 receives another request from the host 1, it issues another seek command B based on the received request. The command controller 4 then transmits the seek command B to the seek command manager 11 (operation 22).

The seek command manager 11 receives the seek command B from the command controller 4 (operation 32). However, since the head position controller 6 is busy executing the seek command A, the seek command manager 11 is unable to transmit the seek command B to the head position controller 6. Hence, the seek command manager 4 queues the seek command B until the end of the seek operation that is being conducted by the head position controller 6 (operation 33). Once the information that the seek operation has ended is received from the head position controller 6, the seek command manager 11 transmits the seek command B to the head position controller 6 (operation 34). The head position controller 6 receives the seek command B (operation 43), activates the actuator, and executes the seek operation (operation 44).

Figure 4:
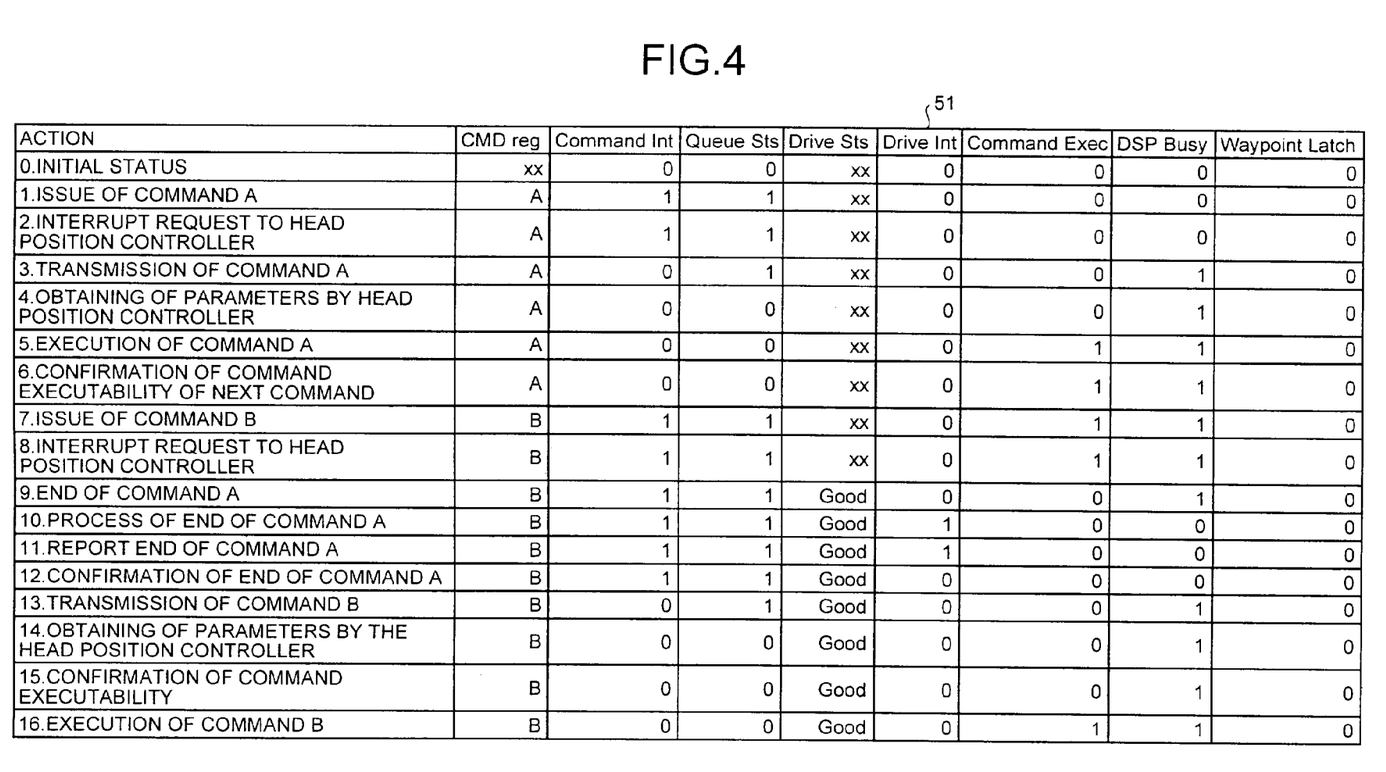
FIG. 4 is a table that shows status parameters of a seek command manager.

The set of status that accomplish the operation of the seek command manager 11, and the change in status parameters that take place during a seek operation are explained with reference to FIG. 4. FIG. 4 shows the status parameters of the seek command manager 11. 'CMD reg' represents the seek command stored in the memory 13. If the value of 'CMD reg' is A it means that the seek command A is stored in the memory 13, and if it is B it means that the seek command B is stored in the memory 13.

'Command Int' represents the interrupt request from the seek command manager 11 to the head position controller 6. When the value of 'Command Int' is '1' it indicates that there is an interrupt request and if it is '0' it means that there is no interrupt request. 'Queue Sts' indicates if there is a command queued in the memory 13. If the 'Queue Sts' is '1', it means that there is a command queued in the memory 13, and if it is '0', it means that there is no command queued in the memory 13. In other words, when the 'Queue Sts' is '1', it means that the seek command that is present in the memory 13 is considered as a queued command. The seek command is distinguished from the other contents stored in the memory 13 by the fact that the value of 'Queue Sts' becomes '0' once the seek command is transmitted.

'Drive Sts' represents whether or not the previous seek command has ended normally. If the 'Drive Sts' is 'Good', it indicates that the seek operation has ended normally, and if it is 'Error' it indicates that the seek operation has ended with an error. 'Drive Int' represents the interrupt request from the seek command manager 11 to the command controller 4. If the 'Drive Int' is '1', it means that there is an interrupt request, and if it is '0', it means that there is no interrupt request. 'Command Exec' is set to '1' when the head position controller 6 starts the seek operation and is reset to '0' when the seek operation ends.

'DSP Busy' is set to '1' when the head position controller 6 receives a seek command and is reset to '0' when the seek operation ends. Similarly, 'Waypoint Latch' is set to '1' on detection by the head monitoring section 15 that the reading or writing has ended, and is reset to '0' when the head position controller 6 starts a seek operation.

In table 51 shown in FIG. 4, the values of 'Command Int', 'Queue Sts', 'Drive Int', 'Command Exec', 'DSP Busy', and 'Waypoint Latch' are '0' at the initial state (0. Initial status). The parameters 'CMD reg' and 'Drive Sts' can have any value.

When the seek command manager 11 receives the seek command A issued from the command controller 4, the value of 'CMD reg' is set to 'A' and the value of 'Command Int' and 'Queue Sts' is set to '1' (1. Issue of command A). Moreover, since the 'Command Int' value is set to '1', an interrupt request is issued from the seek command manager 11 to the head position controller 6 (2. Interrupt request to head position controller).

Because no seek operation by the head position controller 6 is taking place, the seek command manager 11 transmits the seek command A to the head position controller 6, resets the value of 'Command Int' to '0', and sets the value of 'DSP Busy' to '1' (3. Transmission of command A).

The head position controller 6 obtains the values of all the parameters and resets the value of 'Queue Sts' to '0' (4. Obtaining of parameters by head position controller). When the head position controller 6 starts the execution of a seek operation, the value of 'Command Exec' is set to '1' (5. Execution of command A).

The command controller 4 refers to the 'Queue Sts' to confirm if the next seek command can be issued (6. Confirmation of command excitability of next command), and then issues the seek command B. The seek command manager receives the command B and sets the value of 'CMD reg' to 'B' and the values of 'Command Int' and 'Queue Sts' to '1' (7. Issue of command B). As the 'Command Int' value is set to '1', an interrupt request is issued from the seek command manager 11 to the head position controller 6 (8. Interrupt request to head position controller).

However, since the value of 'DSP Busy' is '1', that is, since the head position controller 6 is busy with the seek operation of the seek command A, the value of 'Command Int' and 'Queue Sts' remain unchanged at '1' and await the completion of the seek operation. Once the head position controller 6 ends the seek operation of the seek command A, the seek command manager 11 sets the value of 'Drive Sts) to 'Good' and resets 'Command Exec' to '0' (9. End of command A).

The seek command manager 11 resets the value of 'DSP Busy' to '0' and sets the value of 'Drive Int' to '1' (10. Process of end of Command A). As the 'Drive Int' value is set to '1', an interrupt request is issued from the seek command manager 11 to the command controller 4 (11. Report end of Command). On receiving the interrupt request, the command controller 4 refers to 'Drive Sts' to confirm that the seek command A has ended normally, and resets the value of 'Drive Int' to '0' (12. Confirmation of end of Command A).

The seek command manager 11 transmits the seek command B to the head position controller 6, and sets the value of 'Command Int' and 'DSP Busy' to 1 (13. Transmission of command B). The head position controller 6 obtains the values of all the parameters and resets the value of 'Queue Sts' to '0' (14. Obtaining of parameters by head position controller). The head position controller 6 then refers to the value of 'Drive Int' to confirm that it is '0', that is, a seek operation is possible (15. Confirmation of command executability). The head position controller 6 then starts the seek operation and sets the value of 'Command Exec' to '1' (16. Execution of command B).

The suppression of a seek operation of the head operation controller 8 is explained next. The head operation controller 8 controls the head 9, however, the position of the head 9 with respect to the disk 10 should be fixed beforehand for execution of reading or writing. Therefore, even if a seek command is received by the head position controller 6, it becomes necessary to suppress the seek operation when the head 9 is busy reading or writing.

A suppression bit is used as a method for suppressing the seek operation when the head 9 is busy reading or writing. When it is required to suppress the seek operation owing to reading or writing being carried out by the head 9, the command controller 4 issues a seek command with a suppression bit added to it. On receiving the seek command with the suppression bit, the head position controller 6 holds the seek operation. The head monitoring section 15 monitors the action status of the head operation controller 8. The seek suppressing section 16 suppresses, based on the result of the head monitoring section 15, the seek operation when the head operation controller 8 is busy reading or writing, and once reading or writing has ended, lifts the suppression of the seek operation.

Figure 5:
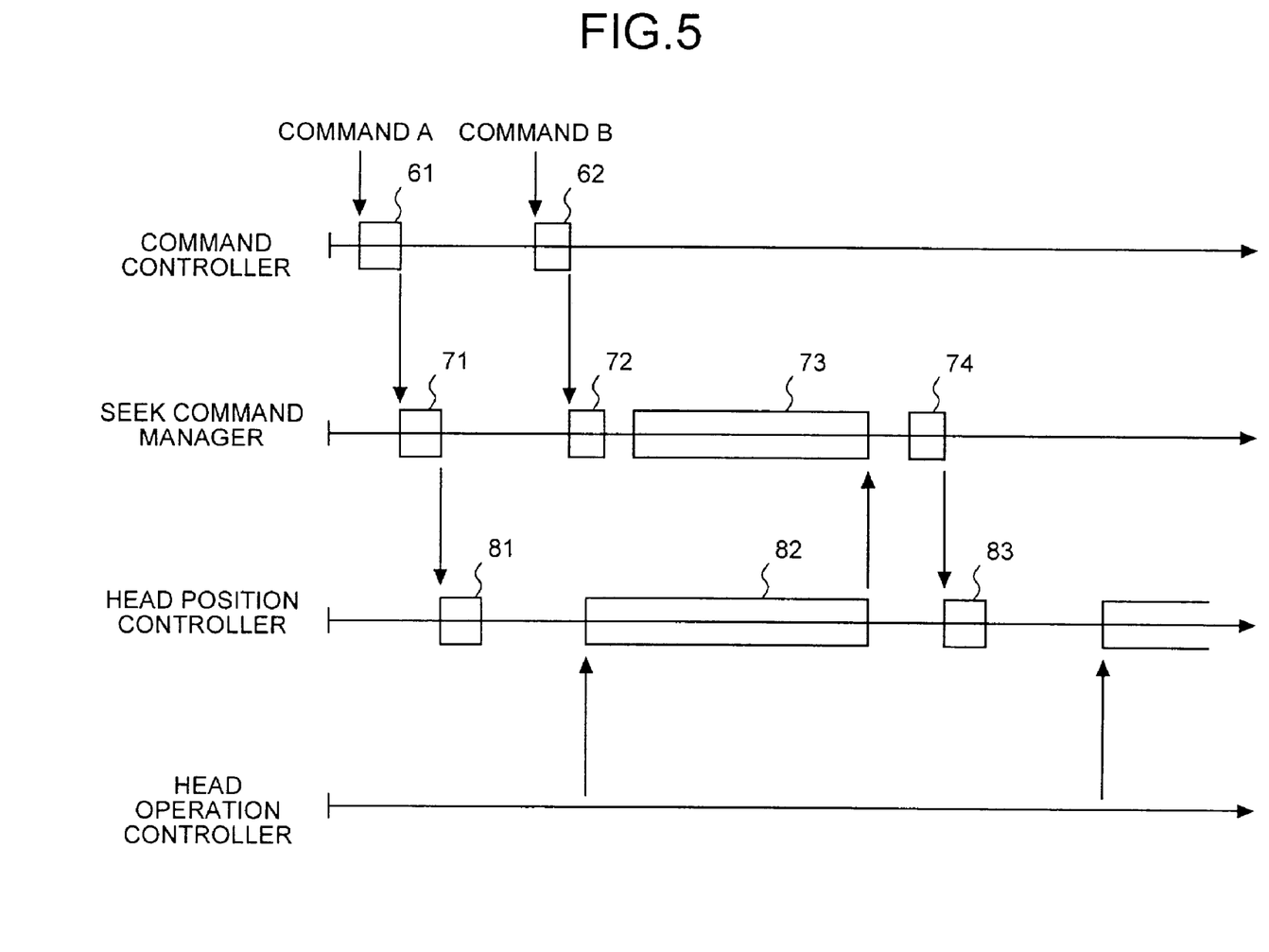
FIG. 5 is a schematic drawing that explains a suppression of a seek operation according to the state of action of a head operation controller.

FIG. 5 is a schematic diagram that explains the suppression of a seek operation according to the action status of the head operation controller 8. The command controller 4 issues, on the basis of a request received from the host 1, a seek command A with a suppression bit added to it. The command controller then transmits the seek command A with the suppression bit to the seek command manager 11 (operation 61).

The seek command manager 11 receives the seek command A with the suppression bit and transmits it to the head position controller 6 (operation 71). The head position controller 6 receives the seek command A with the suppression bit from the seek command manager 11 (operation 81). As the suppression bit is added to the seek command A, the head position controller 6 holds the seek command A until the seek suppressing section 16 lifts the seek suppression. The head position controller 6 initiates the seek operation when the head monitoring section 15 detects that the reading or writing by the head operation controller 8 has ended, and the seek suppressing section 16 lifts the suppression operations (operation 82).

If the command controller 4 receives a next request from the host 1, it issues another seek command B based on the received request. The command controller 4 then transmits the seek command B to the seek command manager 11 (operation 62).

The seek command manager 11 receives the seek command B from the command controller 4 (operation 72). However, since the head position controller 6 is still busy with the seek command A, the seek command manager 11 is unable to transmit the seek command B to the head position controller 6. Consequently, the command controller 4 holds the seek command B as a queued command till the head position controller has finished the seek operation (operation 73). When the head position controller 6 reports that the seek operation has ended, the seek command manager 11 transmits the seek command B to the head position controller 6 (operation 74). The head position controller receives the seek command B (operation 83), and if the seek command B has an attached suppression bit, the seek suppressing section 16 holds the seek command B until the seek suppression is lifted.

Figure 6:
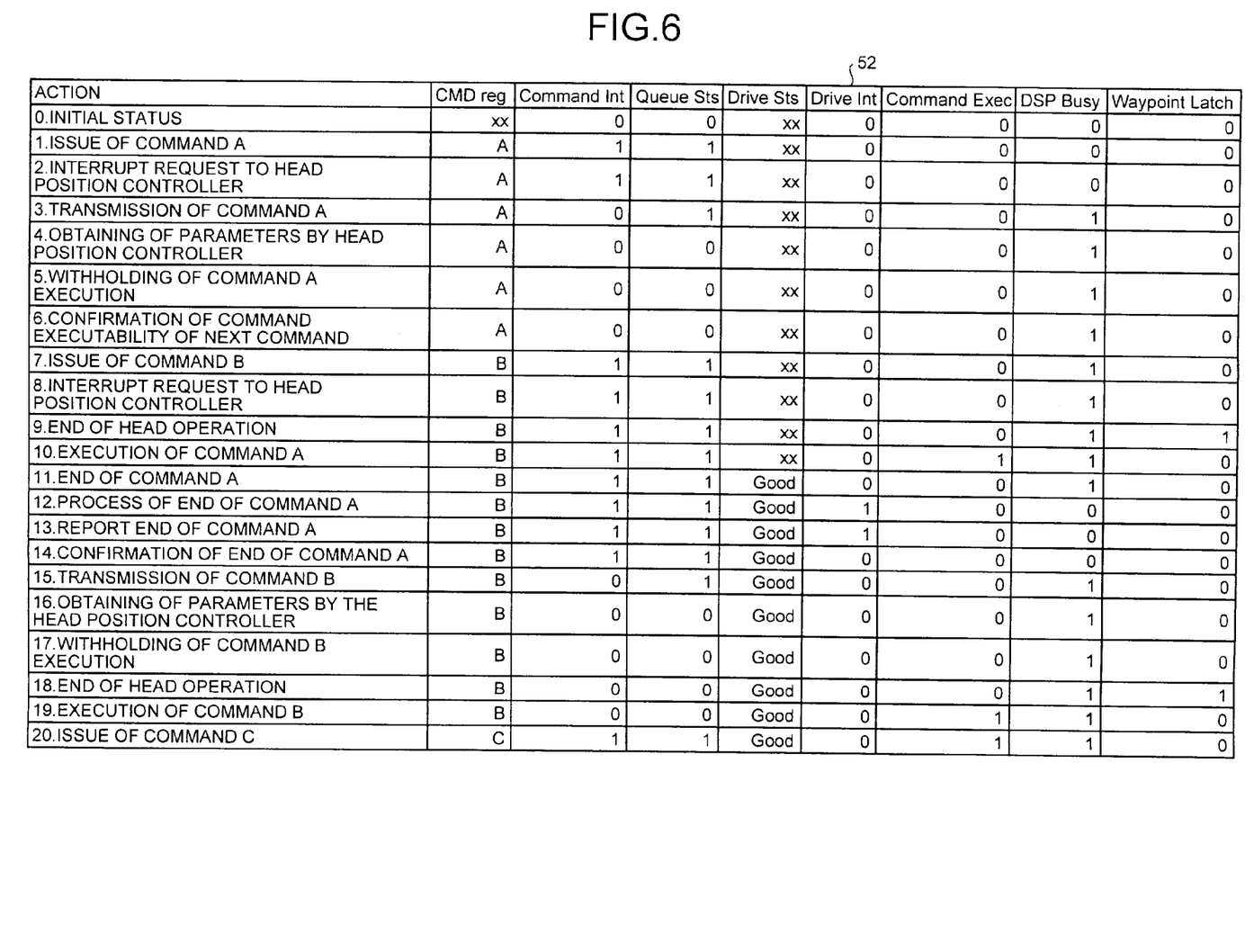
FIG. 6 is a table that shows the status parameters of the seek command manager.

The set of status that accomplish the operation of the seek command manager 11, and the change in the status parameters during a seek operation are explained with reference to FIG. 6. FIG. 6 shows the status parameters of the seek command manager 11. The parameters 'CMD reg', 'Command Int', 'Queue Sts', 'Drive Sts', 'Drive Int', 'Command Exec', 'DSP Busy', and 'Waypoint Latch' in FIG. 6 function identically to the corresponding status parameters in FIG. 4.

As shown in the status table 52 of FIG. 5, the value of 'Command Int', 'Queue Sts', 'Drive Int', 'Command Exec', 'DSP Busy' and 'Waypoint Latch' is '0' at initial status (0. Initial status). 'CMD reg' and 'Drive Sts' can have any value.

The value of 'CMD reg' is set to 'A' and the value of 'Command Int' and 'Queue Sts' is set to '1' when the seek command manager 11 receives the seek command A issued from the command controller 4 (1. Issue of command A). As the 'Command Int' value is set to '1', an interrupt request is issued from the seek command manager 11 to the head position controller 6 (2. Interrupt request to head position controller).

Because no seek operation by the head position controller 6 is taking place, the seek command manager 11 transmits the seek command A to the head position controller 6, resets the value of 'Command Int' to '0', and sets the value of 'DSP Busy' to '1' (3. Transmission of command A).

The head position controller 6 obtains the values of all the parameters and resets the value of 'Queue Sts' to '0' (4. Obtaining of parameters by head position controller). As the seek command A has a suppression bit attached to it, the head position controller 6 confirms the value of 'Waypoint Latch' and, since the value is '0', suppresses the execution of the seek command A (5. Withholding of Command A execution).

Meanwhile, the command controller 4 refers to the 'Queue Sts' to confirm if the next seek command can be issued (6. Confirmation of command excitability of next command), and then issues the seek command B. The seek command manager receives the seek command B and sets the value of 'CMD reg' to 'B' and the value of 'Command Int' and 'Queue Sts' to '1' (7. Issue of command B).

As the 'Command Int' value is set to '1', an interrupt request is issued from the seek command manager 11 to the head position controller 6 (8. Interrupt request to head position controller). However, since the value of 'DSP Busy' is '1', that is, since the head position controller 6 is busy with the seek operation of the seek command A, the value of 'Command Int' and 'Queue Sts' remains unchanged at '1' until the completion of the seek operation.

The head operation controller 8, after finishing reading or writing, causes the seek command manager 11 to issue an interrupt request, which sets the value of 'Waypoint Latch' to '1' (9. End of head operation). The head position controller 6 detects that 'Waypoint Latch' is set to '1', sets the value of 'Command Exec' to '1', and resets the value of 'Waypoint Latch' to '0'. (10. Execution of command A).

Once the head position controller 6 ends the seek operation of the seek command A, the seek command manager 11 sets the value of 'Drive Sts) to 'Good' and resets 'Command Exec' to '0' (10. End of command A). The seek command manager 11 resets the value of 'DSP Busy' to '0' and sets the value of 'Drive Int' to '1' (11. End of command A). Further, the seek command manager 11 resets the value of 'DSP Busy' to '0' and sets 'Drive Int' to '1' (12. Process of end of Command A). As the 'Drive Int' value is set to '1', an interrupt request is issued from the seek command manager 11 to the command controller 4 (13. Report end of Command A). On receiving the interrupt request, the command controller 4 refers to 'Drive Sts' to confirm that the seek command A has ended normally, and resets the value of 'Drive Int' to '0' (14. Confirmation of end of Command A).

The seek command manager 11 transmits the seek command B to the head position controller 6, and sets the value of 'Command Int' and 'DSP Busy' to 1 (15. Transmission of command B). The head position controller 6 obtains the values of all the parameters and resets the value of 'Queue Sts' to '0' (16. Obtaining of parameters by head position controller). As the seek command B has a suppression bit attached to it, the head position controller 6 confirms the value of 'Waypoint Latch' and, since the value is '0', suppresses the execution of the seek command B (17. Withholding of Command B execution).

The head operation controller 8, after it finishes reading or writing, causes the seek command manager 11 to issue an interrupt request, which sets the value of 'Waypoint Latch' to '1' (18. End of head operation). The head position controller 6 detects that 'Waypoint Latch' is set to '1', sets the value of 'Command Exec' to '1', and resets the value of 'Waypoint Latch' to '0'. (19. Execution of command B). The command controller 4 refers to 'Queue Sts.' to confirm whether it is possible to issue the next command, and issues the seek command C. The seek command manager 11 receives the seek command C and sets the value of 'CMD reg' to 'C', 'Command Int', and 'Queue Sts' to '1'. (20. Issue of command C).

The canceling of the seek command issued by the command controller 4 is explained next with reference to FIG. 7A to FIG. 7E. The command controller 4 efficiently manages the various read, write and seek commands issued based on the request from the host 1, by arranging the commands in sequence. It may sometimes be required to cancel a command queued by the seek command manager 11 in order to execute the next command. For this purpose the seek command manager 11 is provided with a status parameter 'Seek Abort' to indicate if a cancel command has been issued by the command controller 4 to cancel a seek command. A queued command can be canceled by changing the value of the 'Seek Abort' parameter.

The various operations performed by the seek command manager 11 in canceling a queued command are explained in FIG. 7A to FIG. 7E. The parameters 'CMD reg', 'Command Int', 'Queue Sts', 'Drive Sts', 'Drive Int', 'Command Exec', 'DSP Busy', and 'Waypoint Latch' figures function identically to the corresponding status parameters in FIG. 4. FIG. 7A indicates the cancel operation when the head position controller 6 is busy executing command A. FIG. 7B indicates the cancel operation when command A is suppressed. FIG. 7C indicates the cancel operation when command A is being executed and command B is queued. FIG. 7D indicates the cancel operation when command A is suppressed and command B is queued. FIG. 7E explains a seek command issued during a cancel operation.

As shown in the status table 53 of FIG. 7A the parameter values at the initial state are as follows: 'CMD reg' is 'A', 'Command Int' is '0', 'Queue Sts' is '0', 'Drive Int' is '0', 'Command Exec' is '1', 'DSP Busy' is '1', 'Waypoint Latch' is '0', and 'Seek Abort' is '0' (0. Initial staus).

When a cancel command is issued by the command controller 4, 'Seek Abort' is set to '1', and 'Command Int' is masked (1. Issue of cancel command). Masking here means that the value of the parameter is recognized as '0' by the head position controller 6, irrespective of the actual value of the parameter. Next, the head position controller 6 recognizes that the 'Seek Abort' has become '1' (2. Confirmation of cancel command by the head position controller). The head position controller 6, upon recognizing the cancel command, resets the value of 'Command Exec', 'DSP Busy', and 'Seek Abort' to '0' after the end of execution of the command A (3. Cancel operation). Setting of 'Drive Int' is not carried out. Subsequently the masking of 'Command Int' is canceled to enable the head position controller to receive a seek command.

As shown in the status table 54 of FIG. 7B, because command A is is being suppressed at the initial state, the parameter values are as follows: 'CMD reg' is 'A', 'Command Int' is '0', 'Queue Sts' is '0', 'Drive Int' is '0', 'Command Exec' is '1', 'DSP Busy' is '1', 'Waypoint Latch' is '0', and 'Seek Abort' is '0' (0. Initial status).

When a cancel command is issued by the command controller 4, 'Seek Abort' is set to '1', and 'Command Int' is masked (1. Issue of cancel command). The head position controller 6 recognizes that the 'Seek Abort' has become '1' (2. Confirmation of cancel command by the head position controller). The head position controller 6, upon recognizing the cancel command, resets the value of 'Command Exec', 'DSP Busy', and 'Seek Abort' to '0' without executing command A (3. Cancel operation). Setting of 'Drive Int' is not carried out. Subsequently, the mask on the 'Command Int' is removed to enable the head position controller 6 to receive a seek command.

As shown in the status table 55 of FIG. 7C, because command A is being executed and command B is queued at the initial state, the parameter values are as follows: 'CMD reg' is 'B', 'Command Int' is '1', 'Queue Sts' is '1', 'Drive Int' is '0', 'Command Exec' is '1', 'DSP Busy' is '1', 'Waypoint Latch' is '0', and 'Seek Abort' is '0' (0. Initial status).

When a cancel command is issued by the command controller 4, 'Seek Abort' is set to '1', 'Command Int' is masked, and 'Command Int' and 'Queue Sts' are reset to '0' (1. Issue of cancel command). The head position controller 6 recognizes that the 'Seek Abort' has become '1' (2. Confirmation of cancel command by the head position controller). The head position controller 6, upon recognizing the cancel command, resets the value of 'Command Exec', 'DSP Busy', and 'Seek Abort' to '0' after the end of execution of the command A (3. Cancel operation). Setting of 'Drive Int' is not carried out. Subsequently, the mask on the 'Command Int' is removed to enable the head position controller to receive a seek command.

As shown in the status table 56 of FIG. 7D, because command A is suppressed, and command B is queued at the initial state, the parameter values are as follows: 'CMD reg' is 'B', 'Command Int' is '1', 'Queue Sts' is '1', 'Drive Int' is '0', 'Command Exec' is '1', 'DSP Busy' is '1', 'Waypoint Latch' is '0', and 'Seek Abort' is '0' (0. Initial status).

When a cancel command is issued by the command controller 4, 'Seek Abort' is set to '1', 'Command Int' is masked, and 'Command Int', and 'Queue Sts' are reset to '0' (1. Issue of cancel command). The head position controller 6 recognizes that the 'Seek Abort' has become '1' (2. Confirmation of cancel command by the head position controller). The head position controller 6, upon recognizing the cancel command, resets the value of 'Command Exec', 'DSP Busy', and 'Seek Abort' to '0' without executing the command A (3. Cancel operation). Setting of 'Drive Int' is not carried out. Subsequently the, mask on the 'Command Int' is removed to enable the head position controller to receive a seek command.

As shown in status tables 53 to 55, when the command controller 4 has issued a cancel command, and the seek command manager 11 has set 'Seek Abort' to '1', the command controller 4 can issue the next seek command without having to wait for the cancel operation to end.

As shown in the status table 57 of FIG. 7E, 'Command Exec' is masked at the initial state. 'Drive Int' is set to '0', and 'Command Exec', 'DSP Busy', and 'Seek Abort' are set to '1' (0. Initial status). When the command controller 4 issues a seek command C, 'CMD reg' is set to 'C', and 'Command Int' and 'Queue Sts' are set to '1' (1. Issue of command C). As 'Command Int' is masked, an interrupt request is not issued to the head position controller 6.

When the cancel operation ends, 'Seek Abort' is reset to '0' and the mask on the 'Command Int' is removed (2. End of cancel operation). Once the mask is canceled, interrupt request is issued to the head position controller 6, and the seek command C is transmitted. 'Command Int' is reset to '0', and 'DSP Busy' is set to '1' (3. Transmission of command C). The head position controller 6 obtains the parameters after the transmission of command C (4. Obtaining of parameters by head position controller), and resets 'Queue Sts' to '0'.

As described above, provision of the status parameter 'Seek Abort' enables cancellation of a queued command, and issue of the next seek command by the command controller 4 without having to wait for the cancel operation to end.

Figure 8A:
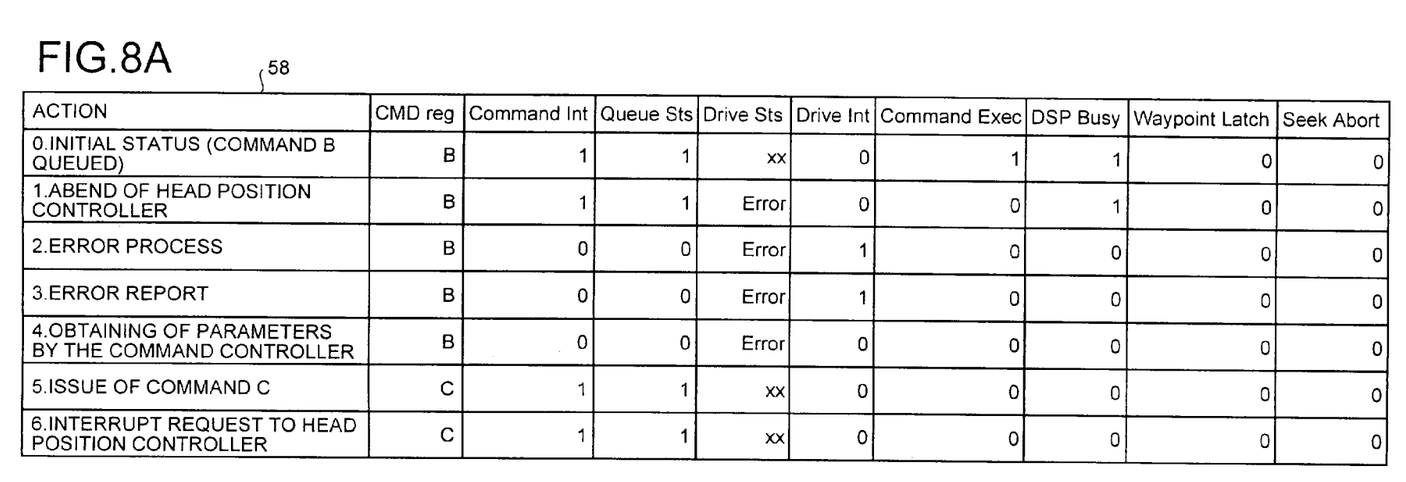
FIG. 8 is a set of tables that show the status parameters of the seek command manager during an error process and seek command update.
Figure 8B:
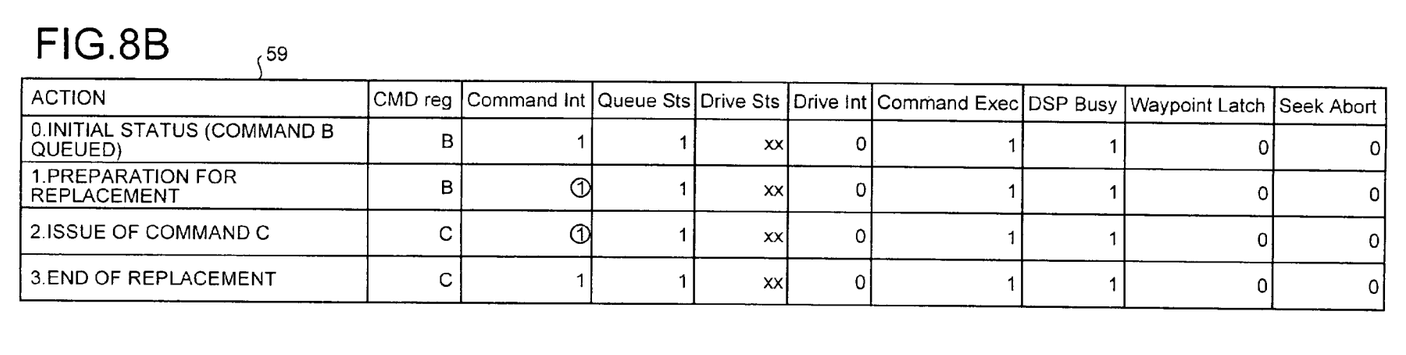

The error processing by the seek command manager 11, and updating of a seek command are explained next with reference to FIG. 8A and FIG. 8B. FIG. 8A shows the change in status parameters when an error occurs. FIG. 8B shows the change in status parameters when a seek command is updated. The parameters 'CMD reg', 'Command Int', 'Queue Sts', 'Drive Sts', 'Drive Int', 'Command Exec', 'DSP Busy', and 'Waypoint Latch' in these two figures function identically to the corresponding status parameters shown in FIG. 4.

As shown in the status table 58 of FIG. 8A, the parameter values at the initial state are as follows: 'CMD reg' is 'B', 'Command Int' is '1', 'Queue Sts' is '1', 'Drive Int' is '0', 'Command Exec' is '1', 'DSP Busy' is '1', 'Waypoint Latch' is '0', and 'Seek Abort' is '0' (0. Initial status). If the seek command A abends under such conditions, 'Drive Sts' is set to 'Error' and 'Command Exec' is reset to '0' (1. Abend of head position controller). 'DSP Busy' is reset to '0', and 'Drive Int' is set to '1'. At the same time 'Command Int' and 'Queue Sts' are reset to '0' (2. Error process).

As the value of 'Drive Int' is set to '1', an interrupt request is issued to the command controller 4, and the abending by head position controller 6 is reported to the command controller 4 (3. Error report). The command controller 4 receives the error report, and after obtaining the parameters of the seek command manager 11, resets 'Drive Int' (4. Obtaining of parameters by command controller). As the value of 'Command Int' is reset to '0', command B is not transmitted to the head position controller 6.

Next, the command controller 4 issues command C, sets 'CMD reg' to 'C', and 'Command Int', and 'Queue Sts' to '1' (5. Issue of command C). The command C that is issued after the error should preferably be a command that recovers the error. As the value of 'Command Int' is set to '1', an interrupt request is issued to the head position controller 6 (6. Interrupt request to the head position controller), and command C is transmitted to the head position controller 6.

As shown in the status table 59 of FIG. 8B, the parameter values at the initial status are as follows: 'CMD reg' is 'B', 'Command Int' is '1', 'Queue Sts' is '1', 'Drive Int' is '0', 'Command Exec' is '1', 'DSP Busy' is '1', 'Waypoint Latch' is '0', and 'Seek Abort' is '0' (0. Initial status). If a queued command is updated under such conditions, that is, if the value of 'CMD reg.' is to be changed from 'B' to another value, 'Command Int' is masked first (1. Preparation for replacement). Consequently 'Command Int' is reset to '0' and no interrupt request is issued to the head position controller 6. Command C is issued next and the command B is updated with the command C (2. Issue of command C). Mask on the 'Command Int' is removed next, thereby ending the update process (3. End of replacement).

When the command is to be updated it is necessary that the value of 'Command Int' is '1', that is, unmasked. The reason for this is that, when 'Command Int' is '1', the command that is set in 'CMD reg' is in a status prior to being transmitted to the head position controller 6 and can be safely updated. However, when 'Command Int' is '0', the command that is set in 'CMD reg' is in a status after being transmitted to the head position controller 6.

Thus, the embodiment according to the present invention is fabricated to function as follows. The command controller 4 first issues a seek command and transmits it to the seek command manager 11. If the head position controller 6 is not busy with the seek operation, the seek command manager 11 transmits the seek command to the head position controller 6. If the head position controller 6 is busy with the seek operation, the seek command manager 11 stores the seek command in the memory 13 until the head position controller 6 ends the seek operation, and transmits the seek command to the head position controller 6 when the seek operation has ended.

Consequently, the load on the command controller 4 is reduced substantially because neither does it has to monitor the status of head position controller 6 nor does it has to issue a seek command based on the result of the monitoring. As a result, the efficiency of the command controller 4 can be increased and speed of the disk storage can be improved by reducing the overheads involved when the command controller 4 issues a command.

The load on the command controller 4 is further reduced because of the provision of the seek command manager 11 that confirms the action status of the head operation controller 8, and if it is busy reading from and writing to the disk 10, suppresses the issue of a seek command.

The seek command manager 11 enables canceling and updating of a seek command that has not been transmitted to the head position controller 6, thereby further reducing the load on the command controller 4 without in any way affecting its flexibility for issuing seek commands.

The disk storage according to the present invention makes it possible to reduce the load on the command controller and increase the operating speed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A disk storage comprising:
   a command controller that issues, based on a read request and a write request, a seek command that specifies a position of a head on a disk, a write command that specifies writing of data on the disk, and a read command that specifies reading of data from the disk;
   a head position controller that carries out a seek operation according to the seek command;
   a head operation controller that controls the head on the disk and carries out the reading of the data from the disk and the writing of the data on the disk according to the read command and the write command, respectively;
   a seek monitoring section that determines whether or not the head position controller is in the process of the seek operation; and
   a command queuing section that, based on the determination by the seek monitoring section, queues the seek command that is issued by the command controller when the head position controller is in the process of the seek operation, and transmits the seek command to the head position controller after the head position controller has finished the seek operation,
   wherein if the command controller specifies cancellation of the seek operation to the head position controller, and if the command controller issues a new seek command while the head position controller is canceling the previous seek command, then the command queuing section queues the new seek command as a queued command without waiting for the cancel operation to end.

2. The disk storage according to claim 1, wherein the seek monitoring section and the command queuing section operate independently of the command controller.

3. The disk storage according to claim 1, further comprising:
   a head monitoring section that determines whether or not the head operation controller is in the process of reading or writing the data; and
   a seek suppressing section that, based on the result of monitoring by the head monitoring section, stops the seek operation by the head position controller if the head controller is in the process of reading or writing of the data.

4. The disk storage according to claim 1, wherein the command queuing section cancels the queued command if the head position controller gives rise to an error.

5. The disk storage according to claim 1, wherein the command queuing section determines whether the transmission of the queued command has started, and allows updating of the queued command by another command only if the transmission of the queued command has not started.

* * * * *